United States Patent
Vokey

(10) Patent No.: US 6,194,889 B1
(45) Date of Patent: Feb. 27, 2001

(54) ENHANCEMENT OF TONE TRANSMISSION OVER CABLE SHEATHS FOR CABLE LOCATION

(75) Inventor: David E. Vokey, Bellingham, WA (US)

(73) Assignee: Norscan Inc., Conover, NC (US)

( * ) Notice: Subject to any disclaimer, the term of this patent is extended or adjusted under 35 U.S.C. 154(b) by 0 days.

(21) Appl. No.: 09/092,846

(22) Filed: Jun. 8, 1998

(51) Int. Cl.⁷ .................................................. G01R 19/00

(52) U.S. Cl. ............................................................ 324/67

(58) Field of Search ............................... 324/66, 67, 326, 324/527, 528, 529; 379/25, 26

(56) References Cited

U.S. PATENT DOCUMENTS 4,549,039  10/1985  Charlebois et al. .
4,862,088 *  8/1989  Etienne et al. ........................ 324/67

FOREIGN PATENT DOCUMENTS 2 300 267  10/1996  (GB) .

* cited by examiner

Primary Examiner—Walter E. Snow
(74) Attorney, Agent, or Firm—Aikins, MacAulay & Thorvaldson; Murray E. Thrift

(57) ABSTRACT

A transmission enhancement system is used for strengthening low frequency cable locating signals on the metallic shields of long underground cables. The system includes equalization circuits on the cable armour or shield at regular intervals, for example at splice locations. The equalization circuit includes an inductor that significantly reduces the rate of attenuation of the low frequency tone signal and greatly enhances the strength of the signal at distances where the signal would otherwise be very weak or unusable. The equalization circuit may be a resonant circuit having a capacitor connected in parallel with the inductor. The capacitor compensates for the inductor's attenuation of high frequency tones for local location purposes. The preferred embodiments of the equalization circuit include a surge arrestor coupled in parallel with the inductor and capacitor.

14 Claims, 3 Drawing Sheets

ENHANCEMENT OF TONE TRANSMISSION OVER CABLE SHEATHS FOR CABLE LOCATION

FIELD OF THE INVENTION

The present invention relates to cable location using a locating tone impressed on the cable.

BACKGROUND

Telephone, cable television (CATV) and other communication and control cables are often direct buried or placed in underground duct structures. For this type of cable placement, the most significant cause of cable outages is caused by dig ups by contractors. In an effort to minimize inadvertent dig ups "call before you dig" programs are heavily promoted. The operating company must then be able to quickly and accurately locate and mark the buried cable.

Methods have been developed and are in commercial use which place a locating tone on the cable sheath via the armour or shield and a special receiver with magnetic field detecting coils is used to sense the tone current travelling along the cable. The strength of the received signal is directly proportional to the magnitude of the tone current in the cable sheath directly below the receiver.

The transmission circuit for the tone signals is formed by a metal armour or shield of the cable, insulated by a plastic cable jacket from earth, which forms the return conductor. The circuit is basically a form of coaxial transmission path with the cable shield or armour forming the inner conductor, the plastic cable jacket the insulator and the surrounding earth forming the outer conductor.

As with any transmission line with resistive elements, the line is lossy, and the loss increases with increasing frequency. In an attempt to reach longer and longer distances, the tone frequency is selected as low as is practical and the input current and power level set as high as is reasonable and safe. Fibre optic cables are often installed in long lengths of up to 75 miles (120 km) or more. Even with the use of low frequencies and high power the signal is often weak or unusable at these long distances.

The situation may be further complicated by a requirement to transmit high frequency tones, which are often used for inductively coupled short distance location applications.

This application relates to the enhancement of the long distance low frequency tones. In preferred embodiments this will not impede the use of high frequency tones for inductively coupled short distance applications.

SUMMARY

According to the present invention there is provided a transmission enhancement system for low frequency cable locating signals on a metallic shield of an underground cable, said system comprising at least one equalization circuit including an inductor connected in series in the shield.

The equalization circuits may be placed on the cable armour or shield at regular intervals, for example at splice locations. This significantly reduces the rate of attenuation of the low frequency tone signal and greatly enhances the strength of the signal at distances where the signal would otherwise be very weak or unusable.

In preferred embodiments of the invention, the equalization circuit includes a capacitor connected in parallel with each inductor to allow local application of high frequency tones for local location purposes without undue attenuation.

The attenuation of the shield with the equalization circuits is preferably no more than 1 dB per mile (0.6 dB per km) at the frequency of the low frequency locating signal. Where the capacitance is included, the inductance and capacitance are selected to provide a resonant circuit with a resonant frequency between the low frequency locating signal and the high frequency local locating signals. The currently preferred circuit acts as a band stop filter with a resonant frequency between 600 Hz and 2500 Hz, to enhance signals at about 500 Hz and allow higher frequency local locating signals, for example at about 8 kHz.

The preferred embodiments of the equalization circuit include a surge arrestor coupled in parallel with the inductor and capacitor.

DETAILED DESCRIPTION

ANALYSIS OF THE CABLE SHEATH AS A TRANSMISSION LINE

Figure 1:
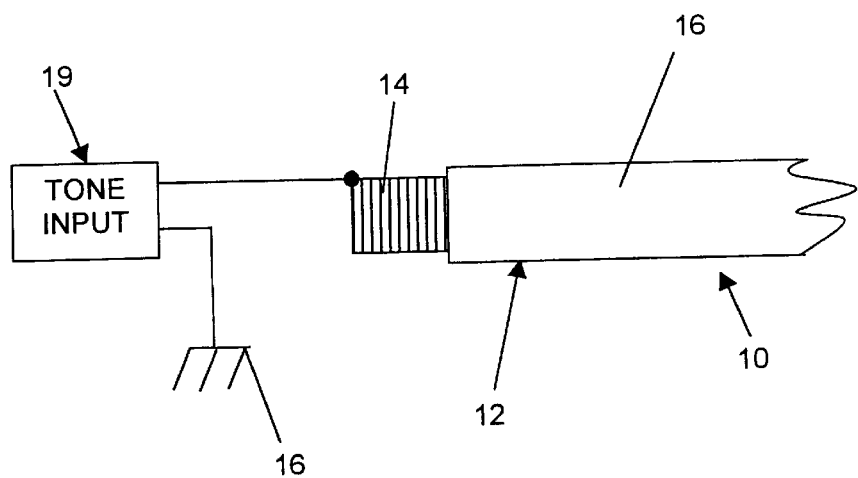
FIG. 1 illustrates the coaxial circuit formed by the cable sheath and earth ground.

Referring to FIG. 1, a cable 10 has a sheath 12 that can be considered a form of coaxial transmission line with the metal armour or shield 14 as the inner conductor, the cable jacket 16 as the insulator and earth 18 as the outer conductor. For location purposes, a tone signal is applied to the sheath by a tone signal input 19.

The attenuation a of the transmission line is given by:

$$\alpha = 8.686 \sqrt{\frac{1}{2} \left[ (rg - \omega^2 lc) + \sqrt{(rg - \omega^2 lc)^2 + (\omega lg + \omega rc)^2} \right]} \text{ dB/unit length} \quad (1)$$

where: r is the armour or shield resistance per unit length;
g is the shunt conductance per unit length;
c is the armour or shield capacitance to ground per unit length;
l is the series inductance per unit length; and
ω is the signal frequency.

Figure 2:
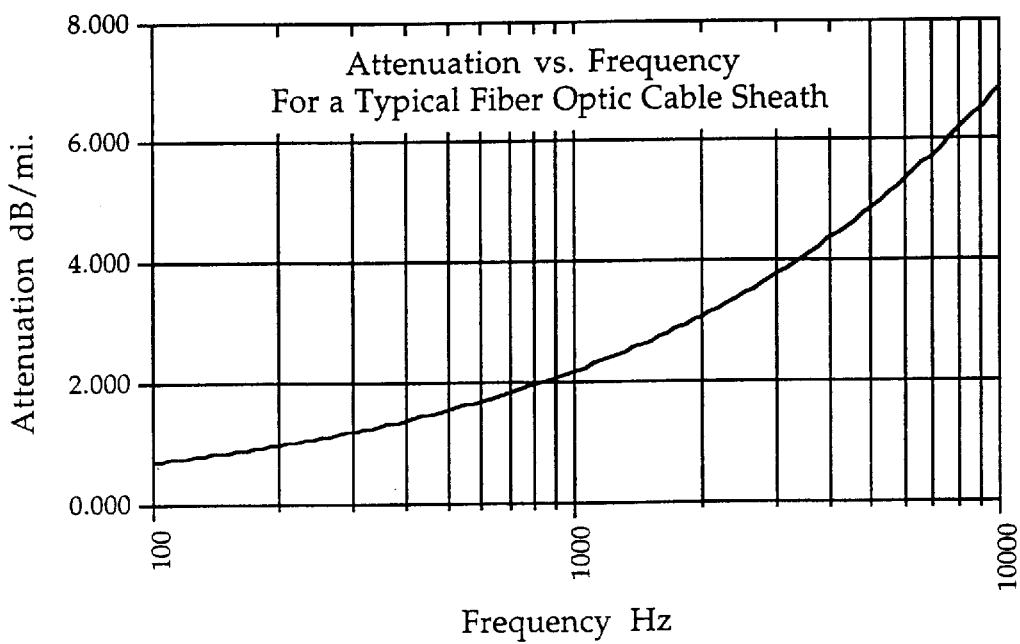
FIG. 2 is a graph illustrating the attenuation characteristics of a typical cable sheath circuit.

The attenuation vs. frequency curve for a typical fibre optic cable sheath is shown in FIG. 2. The attenuation rises with frequency and at typical long distance tone frequencies of around 500 Hz the attenuation is about 1.54 dB per mile. Over 50 miles (80 km) of cable sheath a 500 Hz tone would be reduced in strength by approximately 77 dB. For reasons of safety, tone systems are limited to an output power of around 30 watts. This will result in an input current on the order of 500 mA. At 50 miles (80 km) the current is attenuated to a value of only 0.1 mA which is below the minimum levels for proper detection and fault location.

A typical cable locate receiver requires a sheath current of 2 mA or more for proper operation. This would require 10 times more input current or 100 times more input power.

REDUCING ATTENUATION AT LOWER FREQUENCIES

The present invention addresses this problem by lowering the effective attenuation of the cable sheath line for the low frequency locate tones. This is accomplished by increasing the series inductance which raises the impedance and lowers the attenuation of the line. In the embodiment described below, the inductive component is added in series with the cable armour at splice locations. The series inductor will result in a cutoff frequency beyond which all higher frequencies are highly attenuated. The cutoff frequency $f_c$ due to the series inductance is given by:

$$f_c = 1/(\pi \sqrt{L'C'}) \text{ Hz} \tag{2}$$

where: L' is the total inductance of the cable section including the series inductor; and C' is the total capacitance of the cable section.

Figure 3:
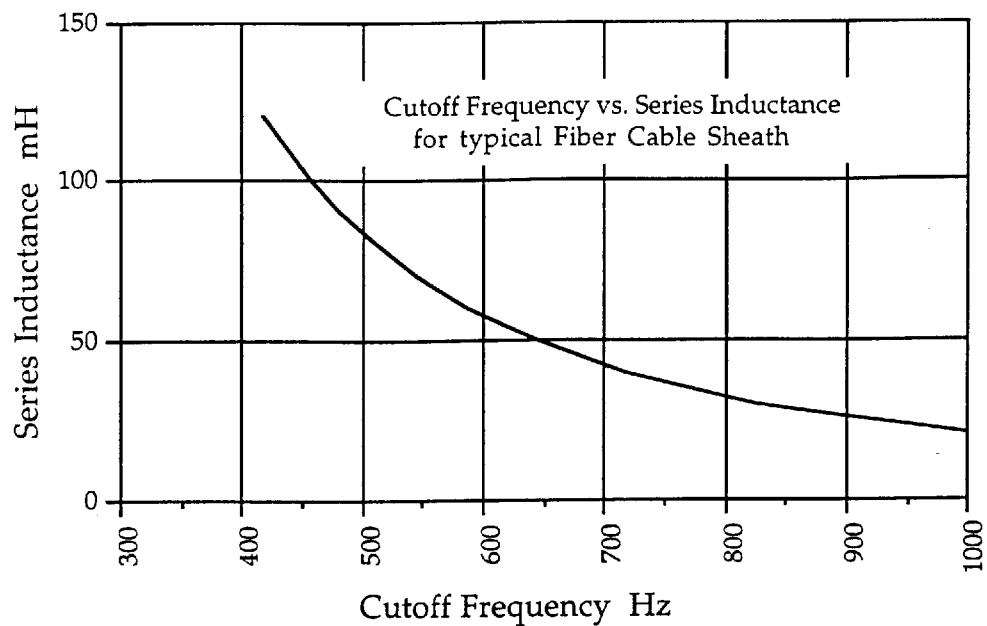
FIG. 3 is a graph illustrating the cutoff frequency of the sheath circuit with added series inductance.

FIG. 3 shows a graph of cutoff frequency for a range of series inductance values for typical fibre optic cable sheath with splice sections of 6 miles (9.6 km) in length. An optimum series inductor value for this would be around 50 mH. This would provide a reduction in attenuation from about 1.54 dB/mile to 0.9 dB/mile (0.96 dB/km to 0.56 dB/km). Over a total length of 50 miles (80 km) the net improvement in signal level would be about 30 dB. This would result in a line current of 3 mA for the earlier example which would provide a strong cable locate signal.

BAND STOP AND HIGH FREQUENCY DESIGN

For local cable toning applications, the tone transmitter is usually placed on the ground above the cable to be located. A coupling coil in the transmitter is used to inductively couple the locate tone to the cable. Frequencies of several thousand Hz are used to provide useful coupling efficiency. The series inductor blocks this tone frequency.

A by pass capacitor is placed across the inductor to allow the high frequency tones to pass along the cable sheath. The capacitor must be selected such that the low frequency performance of the inductor is not significantly degraded yet of a sufficiently large value to couple the high frequency tones from one side of the cable sheath splice to the other.

The inductor and capacitor combination forms a resonant circuit which at a particular frequency forms a band stop filter. The resonant frequency must be chosen such that the band stop is above the low frequency tone band and below the high frequency tone band.

The band stop frequency $f_s$ is given by:

$$f_s = 1/(2\pi\sqrt{LC}) \text{ Hz} \tag{3}$$

where: L is the series inductor value; and

C is the bypass capacitor value

Detailed Description of Circuit

Figure 4:
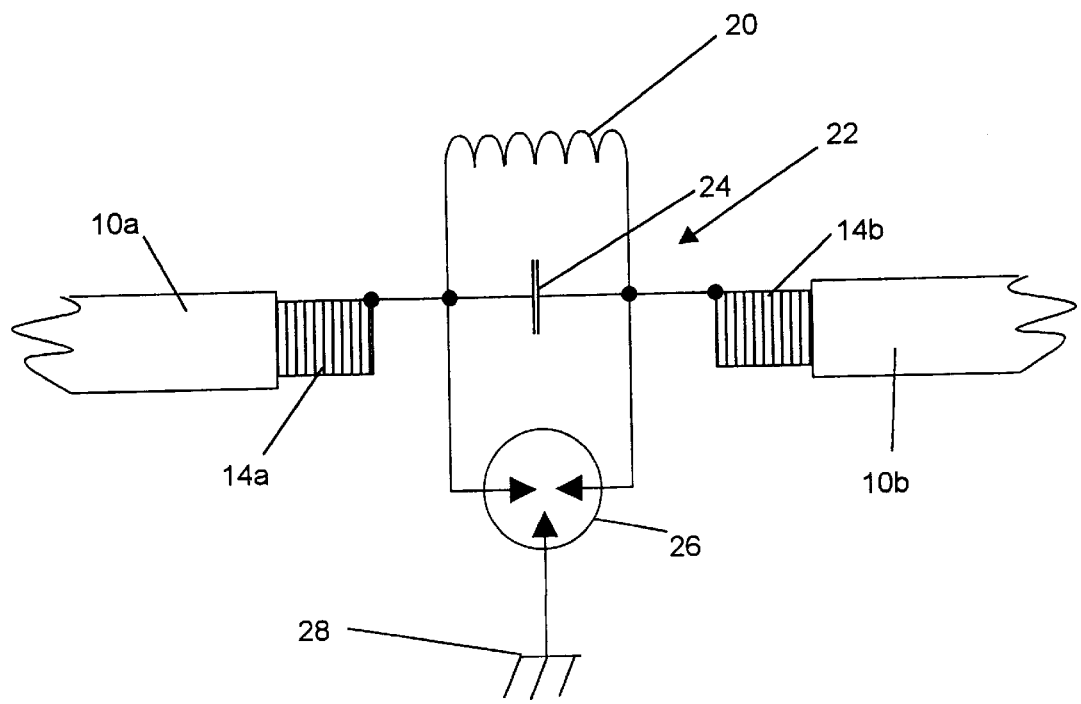
FIG. 4 illustrates an equalization circuit.

Referring to FIG. 4, an inductor 20 of 50 mH is connected on one side of a cable splice 22 to the armour 14a of the originating cable 10a and to the armour 14b of the destination cable 10b on the other side of the splice. By pass capacitor 24 of 0.15 μF is connected in parallel across the inductor 20. A gas tube arrestor 26 is connected to both sides of the circuit and to ground 28. The arrestor will safely ground out over voltage surges from lightning and other foreign sources.

Figure 5:
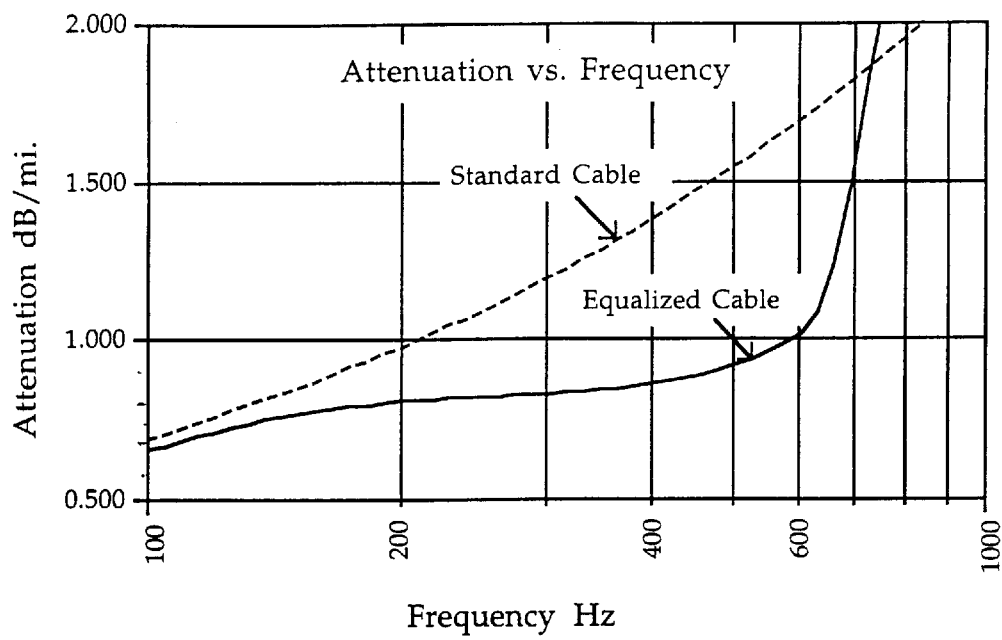
FIG. 5 is a graph showing the attenuation characteristics of an equalized cable sheath at low frequencies.

FIG. 5 shows the attenuation of the cable sheath with the equalization circuit placed at 6 mile (9.6 km) intervals. The attenuation at 500 Hz is about 0.9 dB/mi. (0.56 dB/km) as compared to the non equalized value of 1.54 dB/mi. (0.96 dB/km).

Figure 6:
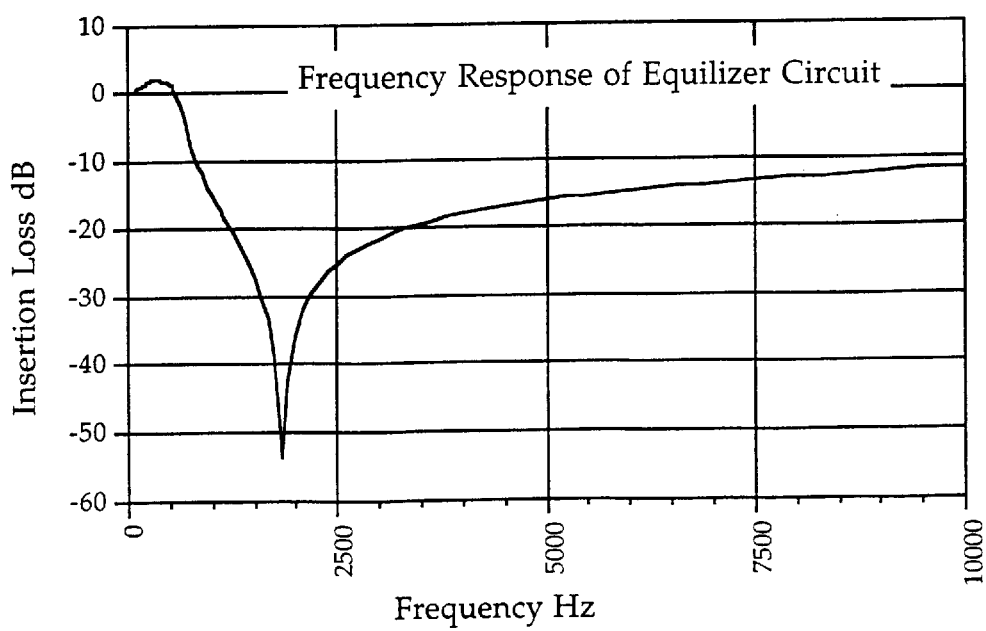
FIG. 6 is a graph showing the frequency response of the equalization circuit over a broad range of frequencies.

FIG. 6 shows the insertion loss of the equalization circuit over a broad frequency range. The band stop frequency is 1820 Hz. The insertion loss at 8 kHz and higher is about 12 dB, which is acceptable for inductive tone coupling.

While one embodiment of the present invention is described in the foregoing, it is to be understood that other embodiments are possible within the scope of the invention, which is to be ascertained solely by the scope of the appended claims.

What is claimed is:

1. In a cable system including an underground cable having a metallic shield, a tone input for applying cable locating signals having a low signal frequency to a circuit comprising the metallic shield of the cable and a ground return, a transmission enhancement system comprising at least one equalization circuit including an inductor connected in series in the shield.

2. A system according to claim 1 wherein the cable includes a plurality of splices spaced therealong, and including a plurality of equalization circuits connected in series with the shield at respective ones of the splices.

3. A transmission enhancement system for cable locating signals having a low signal frequency on a metallic shield of an underground cable, said system comprising at least one equalization circuit including an inductor connected in series in the shield and wherein the attenuation of the shield with the equalization circuits is no more than 1 dB per mile at the low signal frequency.

4. A system according to claim 1 wherein the equalization circuit includes a capacitor connected in parallel with each inductor.

5. A system according to claim 4 wherein the cable includes a plurality of splices spaced therealong, and including a plurality of equalization circuits connected in series with the shield at respective ones of the splices.

6. A transmission enhancement system for use with cable locating signals having a low signal frequency on a metallic shield of an underground cable and inductively coupled cable locating signals having a high signal frequency, said system comprising at least one equalization circuit including an inductor connected in series in the shield, a capacitor connected in parallel with the inductor, the inductance and capacitance comprising a resonant circuit with a resonant frequency less than the high signal frequency.

7. A system according to claim 6 wherein the attenuation of the shield with the equalization circuits is no more than 1 dB per mile at the low signal frequency.

8. In a cable system including an underground cable having a metallic shield, a tone input for applying cable locating signals having a low signal frequency to a circuit comprising the metallic shield of the cable and a ground return, a transmission enhancement system comprising a plurality of equalization circuits connected in series with the shield at respective ones of the splices, each equalization circuit including an inductor.

9. A transmission enhancement system for cable locating signals having a low signal frequency on a metallic shield of an underground cable having a plurality of splices spaced therealong, said system comprising a plurality of equalization circuits connected in series with the shield at respective ones of the splices, each equalization circuit including an inductor, and the attenuation of the shield with the equalization circuits being no more than 1 dB per mile at the low signal frequency.

10. A transmission enhancement system for use with cable locating signals having a high signal frequency and cable locating signals having a low signal frequency on a metallic shield of an underground cable having a plurality of splices spaced therealong, said system comprising a plurality of equalization circuits connected in series with the shield at respective ones of the splices, each equalization circuit comprising a resonant circuit including an inductor and a capacitor connected in parallel with the inductor.

11. A system according to claim 10 wherein the resonant circuit has a resonant frequency greater than the low signal frequency.

12. A system according to claim 10 wherein the resonant frequency is less than the high signal frequency.

13. A system according to claim 10 wherein the resonant circuit has a resonant frequency greater than the low signal frequency and less than the high signal frequency.

14. A system according to claim 10 wherein the equalization circuit includes a surge arrestor coupled in parallel with the inductor and capacitor.

* * * * *